Jan. 18, 1966 P. J. TAMMINEN 3,230,115
PRINTED BATTERY AND METHOD OF MAKING THE SAME
Filed Nov. 16, 1962 2 Sheets-Sheet 1
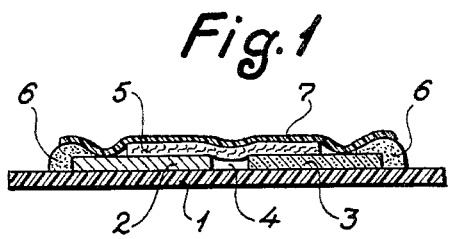
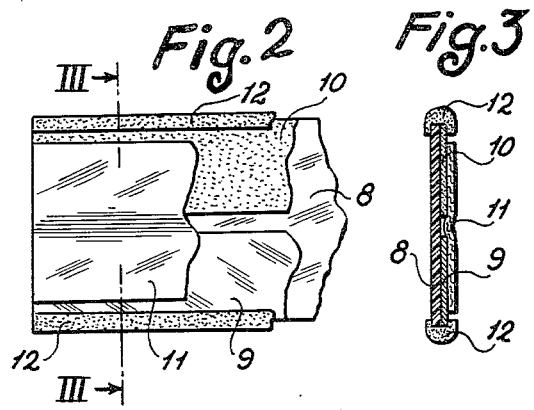
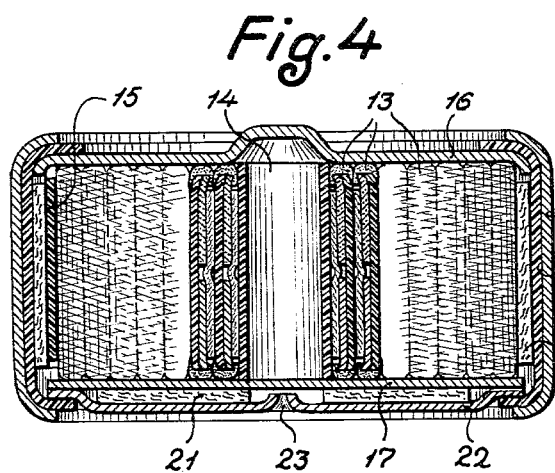
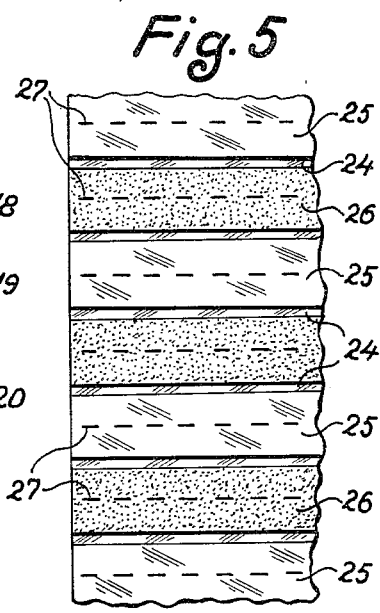
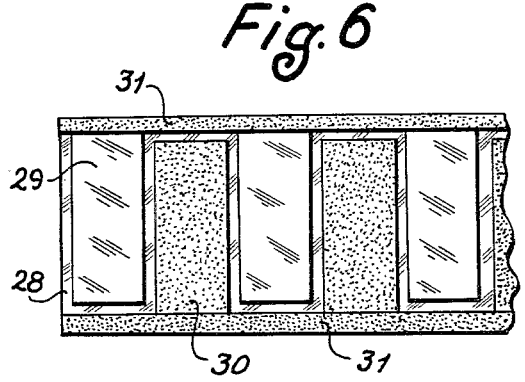
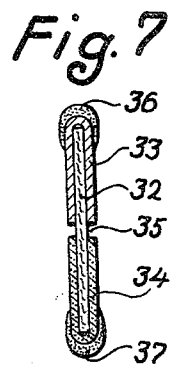

Jan. 18, 1966     P. J. TAMMINEN     3,230,115
PRINTED BATTERY AND METHOD OF MAKING THE SAME
Filed Nov. 16, 1962                                            2 Sheets-Sheet 2

United States Patent Office 3,230,115
Patented Jan. 18, 1966

1

3,230,115
PRINTED BATTERY AND METHOD OF
MAKING THE SAME
Pentti Juuse Tamminen, Otakallio 1B,
Otaniemi, Finland
Filed Nov. 16, 1962, Ser. No. 238,129
5 Claims. (Cl. 136—111)

This invention relates to primary and secondary batteries, and particularly to batteries composed of thin layers which are coated or "printed" on nonconducting, thin sheet material.

The application of printing techniques to the manufacture of galvanic batteries is well known in the art. J. B. Story describes in U.S. Patent No. 3,006,980 a monocell high performance battery having low internal resistance employing printed electrodes. Another battery type utilizing printed members has been described by B. W. Woodring in U.S. Patent No. 2,751,427. It is a multicell application intended for supply of voltage at small current drain.

It is an object of the present invention to provide batteries for both high performance and high voltage purposes. A further object of the invention is to provide batteries composed of thin layers which are coated or printed on non-conducting thin sheet material. It is also an object of the invention to provide a method of making batteries of the types described.

The invention will be described in the following with reference to the accompanying drawing showing some embodiments of the invention, and wherein:

FIG. 1 is a cross sectional view of a cell embodying the invention.

FIG. 2 is a plan view of a slightly modified embodiment.

FIG. 3 is a cross sectional view along line III—III of FIG. 2.

FIG. 4 shows a complete battery utilizing the cell of FIGS. 2 and 3.

FIG. 5 illustrates a convenient method of making the electrodes shown in FIGS. 2 and 3.

FIG. 6 shows a modification of the electrode arrangement for reducing the internal resistance of the battery.

FIG. 7 shows a modification of the electrode arrangement for increasing the ampere-hour capacity of the battery.

Figure 8:
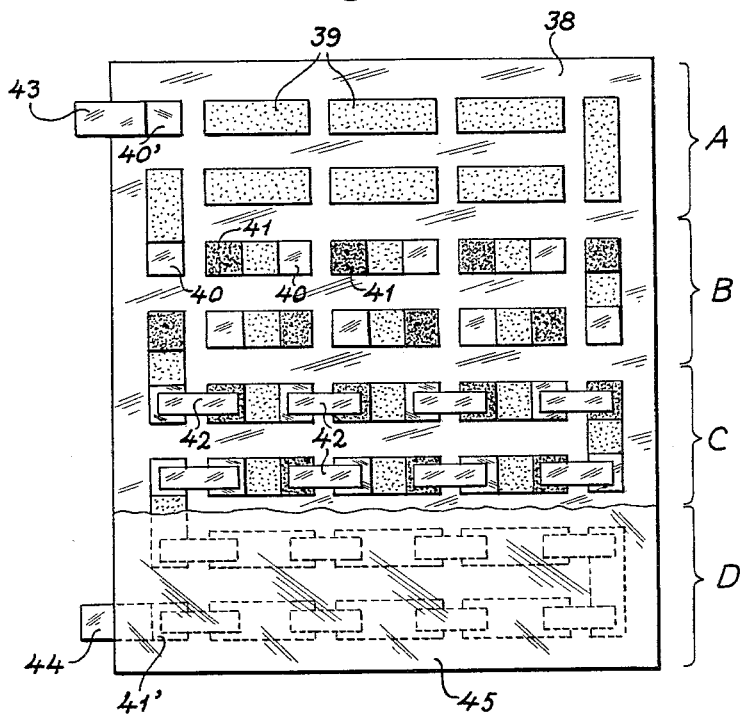
FIG. 8 is a plan view of a battery intended for high voltage supply at low current drain, comprising 32 cells.

FIG. 1 illustrates a cell made in accordance with the invention. On a carrier 1 of a nonconducting sheet material, preferably a plastic foil, there are coated in spaced side by side relationship a metallic zinc electrode 2 and a carbonaceous electrode 3 containing depolarizer material. A gap 4 is left between the electrodes. An electrolyte layer 5 is superimposed overlapping the main portion of electrodes 2 and 3, and bridging the gap 4. The electrolyte layer may be applied in the form of a rather viscous adhesive gel or in the form of a sheet of porous material wetted with electrolyte. The outer edges of the electrodes are provided with lines 6 of conductive electrochemically indifferent paint or ink which form the terminals of the battery.

2

The cell of FIG. 1 can be effectively and simply sealed against short circuits and loss of moisture by spraying on it a thin layer of adhesive plastic paint. Upon evaporation of the solvent, a very thin plastic film is formed capable of venting hydrogen gas formed in the cell, but preventing escape of moisture. This film is indicated at 7 in FIG. 1.

This method of assembling differs essentially from the known methods applied in printed batteries, being a simplification which saves material and makes possible to produce all active parts of the battery by printing techniques even on a single carrier sheet. As a rule, in the known batteries the electrodes are assembled on opposite sides of a porous "separator" spacing the electrodes from each other. By this method no "separator" is needed.

FIGS. 2 and 3 show an embodiment which is slightly modified with respect to that of FIG. 1. Carrier sheet 8, electrodes 9 and 10, and electrolyte layer 11 are arranged as the corresponding parts in FIG. 1, the difference being mainly that the electrodes 9 and 10 extend to the edges of the carrier 8. The conductive lines 12 are heavier in this embodiment, and they may be conveniently produced by dipping the edges of the cell strip in a conductive paint. The cell strip may or may not be coated with a plastic film as in FIG. 1.

FIG. 4 illustrates a battery utilizing a cell strip in accordance with FIGS. 2 and 3. The cell strip 13 is wound tightly around a plastic tube 14, and the outer end of the strip is secured by adhesive tape 15. The compact cell assembly thus produced is pressed between contact plates 16 and 17 and secured by rolling the edges of metallic tube 18 inwards as shown in the drawing. Short circuit is prevented by means of insulating tube 19. Even in case the cell is not sealed by a plastic film the risk of leakage of this battery is reasonably small owing to the expansion space within tube 14 and because the electrolyte tends to keep on and between the electrodes due to the capillary action caused by the layers pressed tightly together. Yet in this case it is advisable to provide sleeve 20 and disc 21 of absorbing material, and an additional bottom plate 22 having a vent hole 23, to prevent leakage in extreme conditions.

FIG. 5 illustrates a convenient method of producing electrode strips as shown in FIGS. 2 and 3. Electrode lines 25 and 26 twice as broad as the final electrodes are coated on carrier sheet 24 and the sheet is cut into strips along lines 27 in the middle of the electrode lines.

FIG. 6 shows an electrode arrangement which is preferred in order to reduce the internal resistance of the battery when a high flash current is desired. Electrodes 29 and 30 are coated on carrier sheet 28 and all electrodes of the same polarity are connected to each other by means of conductive lines 31. In case the electrode layers extend to and around the edges of the carrier, and the battery is assembled e.g. as shown in FIG. 4, these conductive lines may be omitted.

FIG. 7 shows an electrode arrangement in accordance with the invention which is preferred in batteries intended for a high ampere-hour capacity. Nonconducting carrier sheet 32 consists of porous paper, and the electrodes 33 and 34 are coated on both sides thereof by printing or simply by dipping sheet 32 into conductive paints containing finely granulated electrode materials, leaving a gap 35 between the electrodes on both sides of the sheet. When applying the electrodes by dipping, conductive edge lines 36 and 37 may sometimes be omitted, whereas the conductive edge lines must be provided by a separate operation, in case of printing. Mainly in case of alkalic batteries it is preferable to form conductive lines 36 and 37 of extremely thin electrochemically passive metal strips (e.g. copper or steel) folded around the edges of the electrode layers and which strips may even completely cover the outer side of the electrodes. The paper sheet 32 is impregnated with electrolyte which operation preferably is performed by means of vacuum. The electrode unit can be sealed on both sides by a plastic film as described above, or by fastening a thin polyethylene foil on both sides by a contact glue.

The electric units of FIGS. 6 and 7 may be assembled to a battery as shown in FIG. 4. For certain applications it may however be preferable to fold the electrode unit e.g. in a zig-zag manner forming a more or less flat battery.

FIG. 8 shows an embodiment of the invention for high voltage application. On a carrier sheet 38 of nonconductive plastic material there is provided a plurality of oblong flecks of a conductive paint spaced from each other in a preferably regular pattern as indicated in zone A of FIG. 8. Next, electrodes 40 and 41 are provided at the opposite ends of each fleck 39, and in addition at the positions 40' and 41' respectively, which step is illustrated by zone B in FIG. 8. Then follows the step illustrated in zone C which comprises providing layers 42 of an electrolyte colloid covering the main portions of electrodes 40 and 41 and bridging the gaps between them. Finally terminal strips 43 and 44 are connected to the electrodes 40' and 41' respectively, and plastic paint is sprayed on the sheet 38 in the manner described above for effective insulation and sealing of individual cells, or the whole battery sheet 38 may also be dipped into the plastic paint solution.

The battery of FIG. 8 can be produced by four successive printing steps comprising printing of flecks 39, of electrodes 40, of electrodes 41 and of electrolyte layers 42 respectively, and an additional insulation step. It is evident that batteries of very high voltages can be produced in the described manner to a miniature space. Further it is possible to stack several battery sheets in accordance with FIG. 8 on each other and connect them in series. The battery sheet may also be rolled or folded to any shape desired.

Figure 9:
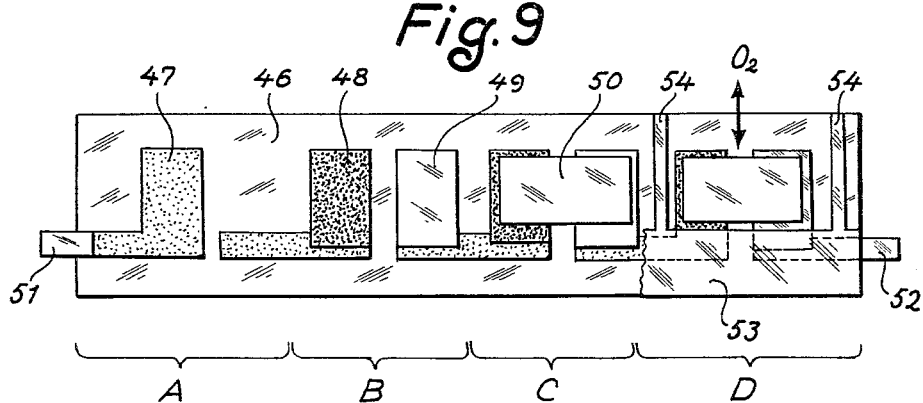
FIG. 9 is a plan view of a battery according to still another embodiment of the invention.

FIG. 9 illustrates the invention as applied to a battery which is depolarized by the atmospheric oxygen. On a carrier sheet 46 of nonconductive plastic material there is provided a plurality of angle-shaped layers 47 of a conductive carbonaceous paint as indicated in zone A of FIG. 9. Layers 48 of activated carbon powder are coated on one leg of layers 47 using e.g. a paste of 35 percent calcium chloride solution and wheat flour (150 g./l.) as binder, and strips 49 of thin zinc foil are connected to the other leg of layer 47 using said conductive paint as adhesive. This step is illustrated in zone B. Over each pair of electrodes 48 and 49 there is applied an electrolyte layer 50 consisting of porous paper impregnated with said paste of calcium chloride and wheat flour, as indicated in zone C. Terminals 51 and 52 are connected to the opposite ends of the electrode series. An insulating, adhesive coating 53 is provided over that portion of the battery sheet which comprises the conductive connections between the electrodes, this coating having lines 54 extending between the individual cells as indicated in zone D. The coating 53, 54 being still tacky, a plastic foil (not shown) may be applied as a protecting cover over the entire sheet 46 which foil adheres to coating 53, 54. The atmospheric oxygen will now have free access to the individual cells as indicated by arrow $O_2$ in the drawing. On the other hand, drying out of the cells is prevented by the very strong hygroscopic action of the electrolyte. The battery sheet may be rolled or folded to any suitable shape, and several sheets may be stacked on each other and connected in series.

The principle of the invention is applicable to a wide variety of battery systems known in the art.

By way of example a Leclanché type battery can be made using the following materials and compositions:

*Conductive ink or paint.*—2 parts of graphite, 1 part of acetylene black, 1 part of polyisobutylene and 6 parts of gasoline.

*Depolarizer.*—7 parts of manganese dioxide powder and 5 parts of the above conductive ink, diluted with gasoline as required.

*Zinc electrode.*—10 parts of zinc powder and 5 parts of the above conductive ink, diluted with gasoline as required.

*Electrolyte.*—35 percent calcium chloride solution gelled by wheat flour or by any other suitable known gelling agent.

*Nonconductive carrier.*—Polyvinyl chloride foil.

*Plastic insulation paint.*—Polyvinyl chloride polyvinyl acetate copolymer dissolved in methyl ethyl ketone.

It may be mentioned that the above zinc electrode composition can be used only in batteries from which the atmospheric oxygen is completely excluded, e.g. as shown in FIG. 8. In case oxygen will have access to the zinc electrode, the carbonaceous material must be omitted.

It should be understood that the embodiments shown and described should be interpreted in an illustrative and not in a limiting sense, and that modifications are possible within the scope of the accompanying claims.

What I claim is:

1. A galvanic battery, comprising a carrier being formed of a strip of plastic foil, a printed anode layer and a printed cathode layer extending laterally spaced from each other on one side of said carrier in the longitudinal direction thereof and covering together a substantial portion of the surface of said carrier, a printed electrolyte containing layer extending over the space between and over at least substantial portions of said anode layer and said cathode layer, printed lines of conductive material connected to said anode layer and said cathode layer, respectively, along the longitudinal edges of said carrier, and a layer of insulation material covering said layers on said carrier and leaving said lines of conductive material exposed.

2. A galvanic battery comprising a carrier being formed of a strip of non-conductive porous sheet material, anode layers extending opposite each other on both sides of the carrier along one longitudinal edge of said carrier, cathode layers extending opposite each other on both sides thereof along the opposite longitudinal edge thereof, said anode layer and cathode layer on the same side of the carrier being laterally spaced from each other and covering together a substantial portion of the surface of said carrier, layers of conductive material connecting said anode layers to each other and said cathode layers to each other at least along the longitudinal edges of said carrier, and an electrolyte incorporated into said porous carrier.

3. A galvanic battery as in claim 2 comprising a layer of insulating material covering said carrier and said layers thereon on both sides thereof and leaving said layers of conductive material exposed along the longitudinal edges of said carrier.

4. A galvanic battery comprising a carrier of nonconductive sheet material, a plurality of anode layers and cathode layers printed on one side of said carrier in laterally spaced alternating relationship, a plurality of printed electrolyte containing layers, each extending over at least substantial portions of one of said anode layers and one adjacent cathode layer and over the space between said anode and said cathode layers to provide galvanic cells, printed layers of conductive material connecting said cells in series, and a layer of insulating material covering said layers on said carrier to provide insulation and sealing of said cells.

5. A galvanic battery as in claim 4, said anodes comprising a mixture of carbonaceous powder and zinc powder.

References Cited by the Examiner

UNITED STATES PATENTS

| | | | |
|---|---|---|---|
| 2,547,262 | 4/1951 | Greenstein | 136—111 |
| 2,688,649 | 9/1954 | Bjorksten | 136—111 |
| 2,913,511 | 11/1959 | Grubb | 136—86 |
| 3,006,980 | 10/1961 | Story | 136—111 |

FOREIGN PATENTS 162,413   4/1955   Great Britain.

JOHN H. MACK, *Primary Examiner.*

W. VAN SISE, *Assistant Examiner.*